United States Patent Office 3,277,150
Patented Oct. 4, 1966

3,277,150
BRAZING OF CERAMICS AND PALLADIUM-NICKEL-TITANIUM BRAZING ALLOY THEREFOR
David Wade Rhys, Hounslow, and Roy David Berry, High Wycombe, England, assignors to The International Nickel Company, Inc., New York, N.Y., a corporation of Delaware
No Drawing. Filed Nov. 19, 1963, Ser. No. 324,876
Claims priority, application Great Britain, Nov. 26, 1962, 44,638/62
6 Claims. (Cl. 260—472.7)

The present invention is directed to a special palladium-base brazing alloy particularly useful for the production of brazed joints between ceramic articles and between ceramic articles and metal articles and to the process for producing such brazed joints.

In the production of ceramic-to-ceramic or ceramic-to-metal joints by brazing, difficulty arises because the brazing alloys used hitherto do not wet the ceramic surface satisfactorily. If the joints are made in the manufacture of articles to be subjected to high temperatures, the brazing alloy must, of course, have a melting point well above the maximum temperature attained after the joint has been made. For instance, in the electronic industry components with such joints are subjected to temperatures of 550° C. and above during degassing and the production of good joints in these components has proved very difficult.

Because of the wetting difficulty, resort has been made to complex procedures. For instance, use has been made of composite brazing wires having an inner core of titanium with an outer covering of a silver-copper brazing alloy. Unfortunately, the composite wire does not wholly melt until a temperature of about 950° C. is reached. The formation of a joint with cored wires of this nature requires that the components of the joint be held at very much higher temperatures than the melting point (about 780° C.) of the brazing alloy for a considerable time and this can be a distinct disadvantage as it may cause the brazing alloy to flow where it is not required and is not wanted. Another method involves metallizing the ceramic surface with molybdenum with or without manganese, titanium or zirconium, and then applying a brazing alloy to the metallized surface. In such processes, palladium-nickel and palladium-cobalt alloys have been suggested as the brazing alloys. However, in joining more than one metallic part to a ceramic part, it is frequently desirable that there shall be no electrically conducting path between the metal parts. As these metal parts may be close together, it is frequently difficult or impossible to apply the metallizing coating to the ceramic surface without producing such an electrically conducting path. Moreover, the coating and subsequent brazing involve two or more processes which are expensive both in time and labor. In addition, the metallizing treatment involves heating to a very high temperature, e.g., about 1550° C., which may adversely affect the properties of the ceramic material.

It has now been discovered that a particular ternary palladium alloy is useful for the production of brazed joints between ceramic articles and between ceramic articles and metal articles.

It is an object of the invention to provide a process particularly adapted for the production of brazed joints in assemblies at least one portion of which is a ceramic article.

It is a further object of the invention to provide an improved brazing process employing a palladium brazing alloy for the purpose of forming brazed joints in assemblies which include at least one portion of a ceramic material.

It is another object of the invention to provide a novel palladium brazing alloy suitable as such for the production of brazed joints in assemblies comprising ceramic materials.

Other objects and advantages of the invention will become apparent from the following description:

The present invention is based on the surprising discovery that certain ternary alloys of palladium, nickel, and titanium have flow properties that are ideally suited to the preparation of brazed joints in assemblies comprising ceramic materials, the molten metal in fact satisfactorily wetting a ceramic surface. According to the invention, a brazing alloy consists of from 30% to 75% palladium and from 2% to 9% titanium, the remainder (except for impurities) being nickel, that is to say, the nickel content may be from 16% to 68%. Advantageously, the titanium content is from 2% to 5%. Particularly suitable alloys are those containing palladium and nickel in the ratio of about 2 to 1 to about 1 to 1, e.g., a ratio of about 3 to 2.

These alloys not only have good wetting properties but, when the titanium content does not exceed about 4% or about 5%, also can readily be drawn to wire or rolled into strip and are thus ideally suited to the formation of localized joints of a complex nature often required in electrical and electronic components. If the alloy is used in the powdered form, workability is unimportant and the titanium content can be raised to 9%.

The titanium content of the ternary palladium-nickel alloy provided in accordance with the invention must be at least about 2%, e.g., about 2.5%, to obtain wetting. Alloys containing more than about 5% titanium cannot be drawn into wire but excellent wetting properties are obtained with such alloys and alloys containing up to about 9% titanium. However, alloys containing more than about 9% titanium have melting points too high for brazing ceramics owing primarily to the inconvenience of obtaining such high temperatures. The following Tables I and II demonstrate the results obtained in two different series of tests with palladium-nickel-titanium alloys containing increasing amounts of titanium with palladium and nickel being in the ratio of 3 to 2:

TABLE I

*Wetting tests in vacuo, palladium-nickel-titanium alloys used to join high-alumina ceramic to a 50% nickel-50% iron alloy*

[Temperature: 1,250°–1,260° C. Time: 10 minutes]

| Percent Titanium | Contact Angle | Comments |
|---|---|---|
| 0.1 | 120 | Did not bond. |
| 2.0 | 90 | Slight bonding. |
| 4.0 | 40 | Bonding of two components together. |
| 6.0 | 40 | Do. |

TABLE II

*Wetting tests in vacuo, palladium-nickel-titanium alloys used to join silicon nitride ($Si_3N_4$) to nickel*

| Percent Titanium: | Comments |
|---|---|
| 0.1 | No wetting. |
| 0.5 | Slight wetting. |
| 2.0 | Partial wetting. |
| 4.0 | Good wetting, bonding of components. |
| 6.0 | Do. |

Some examples of satisfactory brazing alloy compositions contemplated in accordance with the present invention are set forth in the following table:

TABLE III

| Alloy No. | Percent Pd | Percent Ni | Percent Ti | Liquidus Temp., °C. | Solidus Temp., °C. |
|---|---|---|---|---|---|
| 1 | 58 | 39 | 3 | 1,226 | 1,224 |
| 2 | 58 | 38 | 4 | 1,224 | 1,221 |
| 3 | 57 | 38 | 5 | 1,221 | 1,214 |
| 4 | 56 | 37 | 7 | 1,217 | 1,212 |
| 5 | 54.5 | 36.5 | 9 | 1,218 | 1,212 |

It will be appreciated that ternary alloys in accordance with the present invention should contain not more than 2% impurities, i.e., the alloys may contain up to 1% of cobalt, up to 1% of iron, up to 1% of copper and up to 0.1% carbon. Particularly deleterious impurities which should be avoided in the alloys include boron and lithium, which elements contribute to the attack and breakdown of ceramic articles which are brazed with the alloy and contribute "aggressiveness," i.e., an undesirable attack upon the base metal, when the brazing alloy provided in accordance with the invention is employed for brazing metal parts.

In order to give those skilled in the art a better understanding of the invention, the following illustrative example is given:

*Example*

An alloy containing about 57% palladium, 39.5% nickel, and 3.5% titanium is prepared by argon arc melting and cast into an ingot. The ingot is forged by hand swaging and hot rolling using grooved rolls from about a 0.5 inch section to a 0.080 inch section and then cold drawn to 0.060 inch diameter wire. An assembly comprising a ceramic base, a ceramic adjacent portion and a metal adjacent portion made of an alloy containing about 0.08% carbon, about 2.2% titanium, about 20% chromium, about 1.2% aluminum and the balance essentially nickel is prepared. Portions of the wire made in the aforedescribed manner are located adjacent the joints between the ceramic parts and between the metal part and the ceramic base. The assembly is then furnace brazed in vacuo at a temperature of about 1240° C. It is found that sound joints are obtained between the adjacent metal and ceramic parts.

Metals which have to be brazed to ceramic materials commonly consist of alloys which by reason of the presence of chromium, aluminum, titanium or other elements tend to form coherent and tenacious oxide films on their surfaces. Examples are alloys that have a base of nickel, nickel and chromium, nickel and cobalt or nickel, chromium and cobalt, and the austenitic chromium steels. In the production of joints between such metals and ceramic materials according to the invention, the brazing operation may be carried out in hydrogen, in vacuo or in argon and then the brazing alloy reacts with the surface of the ceramic material and with the oxide film on the metal so that a satisfactory joint is formed.

Ceramic materials that may be brazed to themselves, to other ceramic materials or to metal according to the invention include insulating materials essentially composed of metallic oxides such as alumina, magnesia, thoria and zirconia or of aluminosilicic acid or of zirconium silicate or certain nitrides such as silicon nitride, all of which may contain more or less foreign matter such as ferric oxide, silica and calcium carbonate. It is believed that the titanium in the brazing alloy reacts with the oxide on the surface to produce a bond which enhances the flow of the metal in the joint. The ceramics which are brazed in accordance with the invention are dense, essentially crystalline materials having superior low-loss properties at high frequencies and high temperatures, e.g., up to 1100° C. These materials also have high mechanical strength and high shock resistance as compared to glass and serve as nonconductors as well as structural members in hermetically sealed, vacuum-tight, ceramic and metal-ceramic electrical and electronic assemblies. Such assemblies include ceramic "windows" and envelopes for electron tubes, feed-through insulators for hermetically-sealed transformers, capacitors, klystrons, triodes and tetrodes for radar and other high frequency uses, etc.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. In the method for producing brazed metallic bonds between articles of which at least one is made of an insulating ceramic material, the improvement which comprises employing as the brazing material an alloy consisting of about 2% to about 9% titanium, about 30% to about 75% palladium and the balance nickel.

2. The method according to claim 1 wherein the brazing alloy contains about 2% to about 6% titanium.

3. The method according to claim 1 wherein the ratio of palladium to nickel in the brazing alloy is about 3 to 2.

4. A brazing material consisting of about 2% to about 9% titanium, about 30% to about 75% palladium and the balance essentially nickel.

5. A brazing material according to claim 4 wherein the ratio of palladium to nickel is about 2 to 1 to about 1 to 1.

6. A brazing material according to claim 4 wherein the titanium content is about 2% to about 5%.

No references cited.

JOHN F. CAMPBELL, *Primary Examiner.*

UNITED STATES PATENT OFFICE
CERTIFICATE OF CORRECTION

Patent No. 3,277,150                          October 4, 1966

David Wade Rhys et al.

It is hereby certified that error appears in the above numbered patent requiring correction and that the said Letters Patent should read as corrected below.

Column 2, Table II, below heading between lines 65 and 66, insert -- Temperature::1245°-1250° C. --.

Signed and sealed this 29th day of August 1967.

(SEAL)
Attest:

ERNEST W. SWIDER
Attesting Officer

EDWARD J. BRENNER
Commissioner of Patents